United States Patent
Levanon et al.

(10) Patent No.: US 10,287,178 B2
(45) Date of Patent: May 14, 2019

(54) MECHANICAL-BIOLOGICAL FILTER

(71) Applicant: BIOFISHENCY LTD., Misgav (IL)

(72) Inventors: Jacob Levanon, D.N. Hof HaCarmel (IL); Igal Magen, D.N. Hof HaCarmel (IL)

(73) Assignee: BIOFISHENCY LTD., Misgav (IL)

( * ) Notice: Subject to any disclaimer, the term of this patent is extended or adjusted under 35 U.S.C. 154(b) by 165 days.

(21) Appl. No.: 15/028,486

(22) PCT Filed: Dec. 2, 2014

(86) PCT No.: PCT/IL2014/051046
§ 371 (c)(1),
(2) Date: Apr. 11, 2016

(87) PCT Pub. No.: WO2015/083158
PCT Pub. Date: Jun. 11, 2015

(65) Prior Publication Data
US 2016/0251233 A1 Sep. 1, 2016

Related U.S. Application Data

(60) Provisional application No. 61/910,981, filed on Dec. 3, 2013, provisional application No. 61/940,876, filed on Feb. 18, 2014.

(51) Int. Cl.
C02F 1/00 (2006.01)
C02F 3/04 (2006.01)
(Continued)

(52) U.S. Cl.
CPC .............. *C02F 1/001* (2013.01); *A01K 63/04* (2013.01); *A01K 63/042* (2013.01);
(Continued)

(58) Field of Classification Search
CPC . B01D 24/36; C02F 3/087; C02F 3/06; C02F 3/10; C02F 1/001; C02F 3/104;
(Continued)

(56) References Cited

U.S. PATENT DOCUMENTS 6,338,801 B2 * 1/2002 Strom ................ B01D 17/0202
106/122
6,443,097 B1 9/2002 Zohar et al.
(Continued)

FOREIGN PATENT DOCUMENTS

AU 2008203008 A1 1/2009
CN 101880084 A 11/2010
(Continued)

OTHER PUBLICATIONS

Timmons, M.B., et al. "Application of microbead biological filters", Aquacultural Engineering, May 2006, pp. 332-343, vol. 34, Issue: 3.
(Continued)

*Primary Examiner* — Claire A Norris
(74) *Attorney, Agent, or Firm* — The Roy Gross Law Firm, LLC; Roy Gross

(57) ABSTRACT

A water filter, comprising a mechanical filter and a biological filter in fluid communication with the mechanical filter is disclosed. The biological filter comprises a carbon dioxide stripper and a nitrification bed.

16 Claims, 4 Drawing Sheets

(51) Int. Cl.
*C02F 3/30* (2006.01)
*C02F 3/08* (2006.01)
*A01K 63/04* (2006.01)
*C02F 103/20* (2006.01)

(52) U.S. Cl.
CPC .............. *A01K 63/045* (2013.01); *C02F 3/04* (2013.01); *C02F 3/087* (2013.01); *C02F 3/303* (2013.01); *C02F 2103/20* (2013.01); *C02F 2201/007* (2013.01); *Y02W 10/15* (2015.05)

(58) Field of Classification Search
CPC ........ C02F 3/302; C02F 3/303; A01K 63/042; A01K 63/04; A01K 63/045
USPC ............................ 210/617, 150, 170.02, 903
See application file for complete search history.

(56) References Cited

U.S. PATENT DOCUMENTS

| | | |
|---|---|---|
| 6,447,681 B1 | 9/2002 | Carlberg et al. |
| 7,527,730 B2 | 5/2009 | Johannsson et al. |
| 2005/0029204 A1* | 2/2005 | Schwartzkopf .... B01D 21/0012 210/793 |
| 2007/0056890 A1 | 3/2007 | Johannsson et al. |
| 2013/0134091 A1 | 5/2013 | Michaels et al. |
| 2013/0247832 A1 | 9/2013 | Holder et al. |

FOREIGN PATENT DOCUMENTS

| | | |
|---|---|---|
| CN | 201817341 U | 5/2011 |
| EP | 1934146 A1 | 6/2008 |
| FR | 2828189 A1 | 2/2003 |
| WO | 03/032718 A2 | 4/2003 |
| WO | 2009007962 A2 | 1/2009 |
| WO | 2012140183 A1 | 10/2012 |

OTHER PUBLICATIONS

European Office Action 14868407.9 dated Jan. 17, 2018.

* cited by examiner

MECHANICAL-BIOLOGICAL FILTER

FIELD OF INVENTION

The invention relates to the field of water filtration.

BACKGROUND OF THE INVENTION

Aquaculture is one of the fastest-growing food sectors, with an annual growth rate said to be in the range of 8-9 percent. Stimulated by increased demand for fish, world fisheries and aquaculture production is projected to reach about 172 million tons in 2021, according to some estimates. The main challenges of the sector include illegal, unreported and unregulated (IUU) fishing, environmental impact, disasters and energy prices. This is especially true in developing countries.

Aquatic animals excrete metabolites (predominantly carbon dioxide, $CO_2$ and ammonia, $NH_3$) and feces into the water. With increasing fish density, these excretions may become toxic and induce pathogen growth. Oxygen demand also increases with density. The importance of water chemistry control thus increases with fish density. Other important aspects of fish culture are freshwater consumption and release of pollutants to the environment.

U.S. Pat. No. 7,527,730 discloses a filtration system which comprises at least one chamber which contains a water inlet, means for distributing water, at least one braker grid, and a water outlet. The braker grid serves the role of providing support to the filtration medium within the chamber, and thus preventing water channeling within the chamber.

PCT Publication No. WO 2003/032718 discloses filtration and aquaculture systems comprising *planctomycetes* sp. Bacteria that convert ammonia to nitrogen under aerobic conditions, and methods of filtration using *Planctomycetes* sp.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

According to an aspect of some embodiments of the present invention, there is provided a water filter, the water filter comprising a mechanical filter; a biological filter in fluid communication with the mechanical filter, the biological filter comprising a carbon dioxide stripper and a nitrification bed.

According to some embodiments, the water filter is configured such that said mechanical filter and said biological filter are substantially co-located as a single module.

According to some embodiments, the biological filter is disposed downstream of said mechanical filter, configured to receive mechanically filtered water from the mechanical filter, the mechanically filtered water being essentially free of solids.

According to some embodiments, the water filter is configured as a filtration system for filtering water, and comprises a housing, the housing comprising: a water inlet configured to provide unfiltered water to the mechanical filter and a water outlet configured to allow filtered water to exit the water filter.

According to some embodiments, the mechanical filter comprises a sieve and a first dispersing element, the first dispersing element being configured to disperse incoming unfiltered water over the sieve. According to some embodiments, the sieve is characterized by a pore size that ranges from approximately 50 micron to approximately 120 micron.

According to some embodiments, the mechanical filter further comprises an opening configured to allow removal of particles from said water by said at least one sieve to exit the mechanical filter.

According to some embodiments, the mechanical filter further comprises a nozzle configured to inject water to remove said particles from said sieve and a pipe attached to or integrally formed with said sieve, the pipe being configured to lead the particles out of said mechanical filter through the opening.

According to some embodiments, the biological filter further comprises a second dispersing element, the second dispersing element being configured to disperse the mechanically filtered water from the mechanical filter into the carbon dioxide stripper.

According to some embodiments, the biological filter further comprises a floating media bed. According to some embodiments, the floating media bed further comprises multiple beads configured to allow growth of nitrifying bacteria. According to some embodiments, the bacteria form bacterial biofilm.

According to some embodiments, the multiple beads are characterized as having an overall bulk density that ranges from approximately 0.1 kg/m$^3$ to approximately 1 kg/m$^3$. According to some embodiments, the multiple beads are characterized as having a surface area per unit volume that ranges from about 200 m$^2$/m$^3$ to about 5000 m$^2$/m$^3$. According to some embodiments, the multiple beads are characterized by a largest dimension measuring between 0.05 mm and 10 mm.

According to some embodiments, the multiple beads are characterized as being hydrophobic. According to some embodiments, the multiple beads each comprises a matrix of one or more polymers selected from the group consisting of: polystyrene, and any derivatives thereof.

According to some embodiments, each of the multiple beads is hydrophilically coated by one or more materials selected from the group consisting of: poly(vinyl acetate), poly(vinylpyrrolidone), ester, alginic acid, acrylate, poly(n-vinyl caprolactam), polyhydric alcohol, poly(alkylene glycol), poly(acrylic acid)-hydroxypropyl, and any copolymer thereof. According to some embodiments, the multiple beads are characterized as being hydrophilic. According to some embodiments, the multiple beads being hydrophilically coated are hydrogels.

According to some embodiments, the water filter as disclosed herein is characterized by a nitrification rate that ranges from approximately 0.5 grams of Nitrite per liter per day to approximately 2.5 grams of nitrite per liter per day. According to some embodiments, the water filter is characterized by a nitrification rate that ranges from approximately 1.5 grams of nitrite per liter per day to approximately 2.5 grams of nitrite per liter per day if the beads are hydrophilically coated.

According to an aspect of some embodiments of the present invention, there is provided a method for water filtering, the method comprising the following steps, being performed sequentially: (a) filtering water by a mechanical filter comprising at least one sieve, so as to substantially remove solids from said water; and (b) filtering the water in a biological filter, the filtering comprising operating an air blower so as to oxygenate the water and substantially remove carbon dioxide from the water; and allowing the water to pass into floating media bed, said floating media bed comprising beads attached to nitrifying bacteria, so as to substantially remove ammonia content from the water.

According to some embodiments, step (a) further comprises a step of dispersing the water using a dispersing element. According to some embodiments, step (b) further comprises a step of dispersing the water to form water droplet, the dispersing being followed by the air blowing.

According to some embodiments, the method is characterized by nitrification rate that ranges from approximately 0.5 grams of nitrite per liter per day to approximately 2.5 grams of Nitrite per liter per day.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 3A presents a reference image of uncoated EPS (being a white sphere) vis-à-vis a coated bead (×40 magnification). FIG. 3B presents an image showing coated EPS beads being cut using a sharp knife, revealing a skin layer coating adhered to the inner EPS layer, with the skin layer having a thickness of about 10 to 50 microns (×200 magnification);

DETAILED DESCRIPTION OF THE INVENTION

Figure 1:
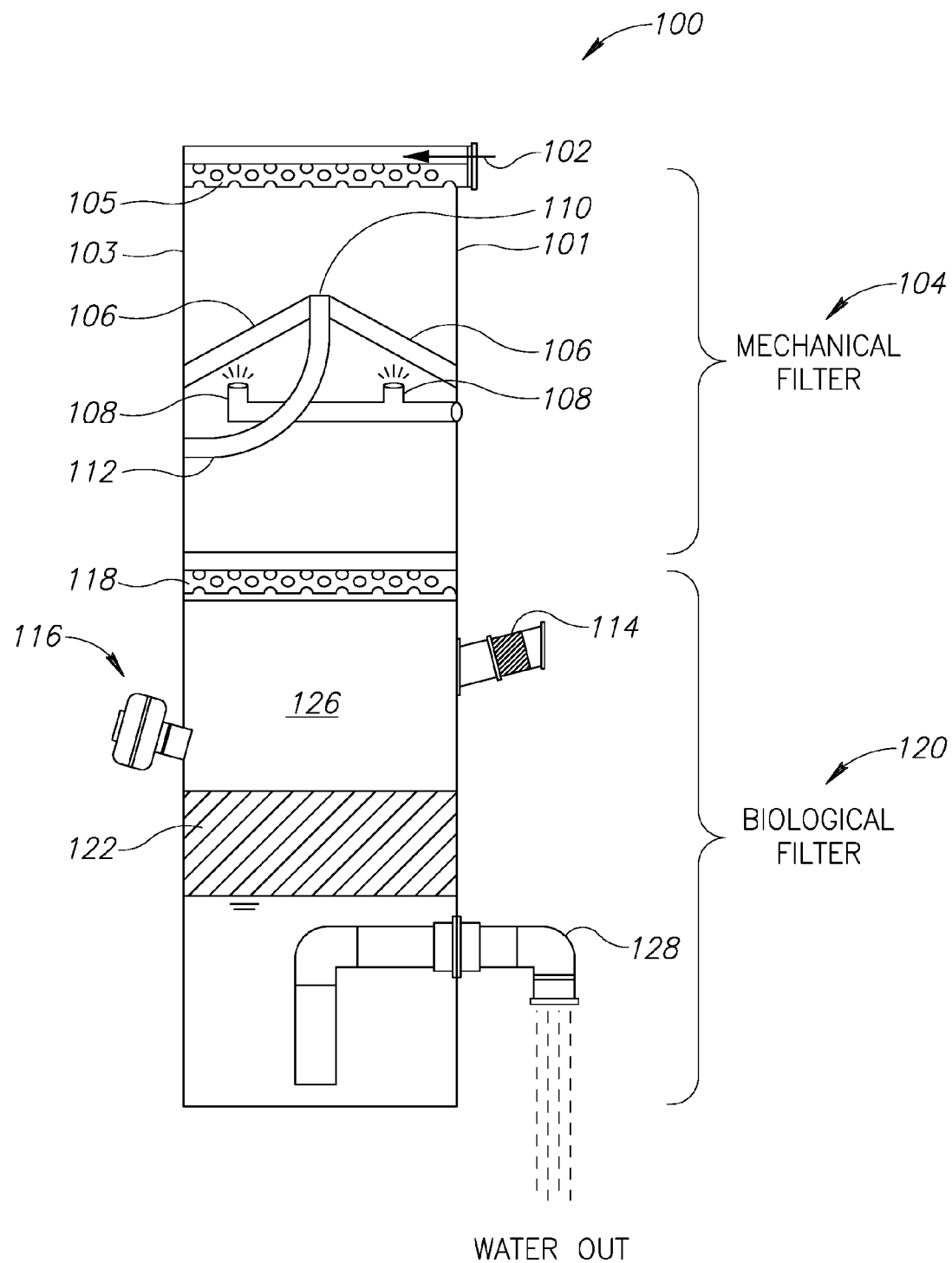
FIG. 1 shows a perspective view of an exemplary filtration system.

Disclosed herein is a combined mechanical and biological filtration system (hereinafter "filtration system") for purifying water, especially (but not exclusively) in aquaculture.

The filtration system of the kind provided herein may comprise units with various water treatment functions. The choice of treatment functions to be included may be made based on the specific properties and quality of the water to be treated, on the basis of intended properties of the filtered water, based on regulatory requirements and many others.

As will be appreciated, the system provided herein is not limited to a certain combination of water filtration units.

The filtration system, in some embodiments thereof, may include a mechanical filter configured for filtering particles larger than a predetermined size, and a biological filter configured for water oxygenation and the nitrification of ammonia. The biological filter may be in fluid communication with the mechanical filter. Optionally, the biological filter is disposed downstream of the mechanical filter, such that water reaching the biological filter are essentially free of solids.

The mechanical filter may be especially advantageous for use with fish tanks and/or fish ponds, where solids must be routinely removed from culture water to prevent pathogen growth and sulfide formation in anaerobic zones.

The biological filter, in turn, may also be advantageous in fish tank/pond environments, where the removal of carbon dioxide and ammonia is important for preventing their levels from reaching hazardous concentrations.

Influent unfiltered water may reach the mechanical filter through a water inlet. The mechanical filter may include a water disperser configured for dispersing the water over a sieve which has a pore size of about 50 to 100 microns, for example. The sieve may remove certain particles, commonly of feces, from the water passing through it. The particles stopped by the sieve may accumulate on its top surface. To discard of these particles, they may be driven by influent water movement over the sieve towards an evacuation opening, optionally located in the middle of the sieve. Additionally or alternatively, the accumulated particles may be driven towards the evacuation opening using water injected by one or more nozzles from the bottom of the sieve, penetrating through the pores of the sieve and pushing particles from the pored towards the evacuation opening.

The biological filter may include a water disperser, a blower and a floating media bed of highly buoyant microbeads with a large surface area, suitable for nitrifying bacterial growth and maintenance. Influent water may be dispersed over the top of the media bed, forming water droplets. The blower may drive air from outside the filter to impinge on the water droplets, enriching the water with oxygen and discarding of carbon dioxide, in a process commonly referred to as $CO_2$ stripping. Following the stripping, the water may trickle down through the media, allowing for water nitrification by the bacterial growth. The water may then be led out of the biological filter by a water outlet. Optionally, a second, finer sieve may be positioned downstream the biological filter.

Ammonia removal, as further discussed hereinbelow, may be achieved through bacterial nitrification. Nitrification is an aerobic two-step process, where the ammonia is first oxidized to nitrite ($NO_2^-$) and then nitrite is oxidized to nitrate ($NO_3^-$). Nitrification is carried out by autotrophic bacteria that are characterized by relatively low growth rate. Therefore, in order to establish a large bacterial population and correspondingly high ammonia oxidation rate, some solid material is supplied to support bacterial growth as a "fixed film". Higher surface area of such supporting bed will enable higher reaction rate. In some embodiments, the biological filter is an advantageous adaptation of the filter proposed by Michael B. Timmons, John L. Holder and James M. Ebeling, "Application of microbead biological filters", Aquacultural Engineering 34 (2006) 332-343, incorporated herein by reference.

The filtration system may be mobile and may be installed in a number of different configurations and locations. The filtration system is optionally divided into two separate units: (1) the mechanical filter and (2) the biological filter. The two units may be packaged inside a common housing or in separate housings. Each of the units may be placed in different locations relative to each other and to the water origin and destination. According to the relative spatial planes of the two units to each other and to the water origin and destination, the water may be transported, to, through and from the system, by one or more pumps and/or gravitational forces. In one configuration, the mechanical filter may be placed below the water level of the water origin and the biological filter may be placed above the water level of the water origin. In another configuration, the mechanical filter may be placed above the biological filter, and both may be placed above the water level of the water origin. In an additional configuration, the two units may be placed parallel to each other.

In some embodiments, the filtration system is configured such that the mechanical filter and the biological filter are substantially co-located as a single module.

Reference is now made to FIG. 1, which shows a perspective view of an exemplary filtration system 100, in which a mechanical filter and a biological filter are housed together.

Filtration system 100 may have a housing 101. Housing 101 may fully encapsulate elements of filtration system 100 and may be made of a rigid, durable material, such as Aluminum, stainless steel, a hard polymer and/or the like. Housing 101 may fully or partially encapsulate elements of filtration system 100. Housing 101 may have a cylindrical, conical, rectangular or any other suitable shape. Housing 101 may prevent unwanted foreign elements from entering filtration system 100.

Filtration system 100 may have a water inlet 102. Water inlet 102 may include a pipe of various shapes and sizes, connected to, attached to or integrally formed with filtration system 100. Water inlet 102 may allow unfiltered water from a fish tank/pond to enter filtration system 100.

Filtration system 100 may further include a mechanical filter 104. Mechanical filter 104 may include a dispersing element (also "water disperser") 105, such as a spray diffuser, a flooded perforated plate and/or the like. Dispersing element 105 may be connected to, attached to or integrally formed with housing 101.

Dispersing element 105 may disperse incoming unfiltered water over a sieve 106. Sieve 106 may be a conical, perforated plate with a pore size of between 30 to 120 microns. In some embodiments, the pore size is between 40 to 110 microns, 50 to 100 microns or 60 to 90 microns. Sieve 106 may be positioned within housing 101 with its tapering part pointing upwards. Instead of an apex, the perforated plate may include a circular opening 110 in its center, as will be discussed below. If housing 101 is cylindrical, then sieve 106 may encompass the entire internal diameter of the housing. Sieve 106 may remove particles larger than the size of its pores from water flowing through it.

Mechanical filter 104 may further include one or more nozzles 108. Nozzles 108 may be a fluid jet nozzle, a laminar jet nozzle, a convergent nozzle, a divergent nozzle, a convergent-divergent nozzle, a spray nozzle or the like. Nozzles 108 may be positioned adjacent, downstream of sieve 106. Nozzles 108 may inject water, which may drive particles removed by sieve 106, towards opening 110. Nozzles 108 may operate automatically. Nozzle 108 may inject water at set times and/or intervals. Nozzle 108 may inject water according to the amount of particles accumulated on sieve 106 and/or its surroundings, based on readings of a sensor (not shown). Nozzle 108 may inject water at a constant pressure and/or volume. Nozzle 108 may inject water at varying pressure and/or volume.

Opening 110 may be located at the center of sieve 106. Opening 110 may be of various sizes and shapes. Opening 110 may allow particles, which may have been removed from the water by sieve 106, to exit mechanical filter 104. A pipe 112 may be adjacent or abutting to opening 110. Pipe 112 may be a funnel. Pipe 112 may be connected to, attached to or integrally formed with sieve 106. Pipe 112 may lead particles exiting opening 110 out of filtration system 100.

Filtration system 100 may further include a biological filter 120. Biological filter 120 may include an oxygenation area 126 configured to oxygenate water reaching from mechanical filter 104, removing at least e.g., 30% CO2, 40% CO2, 50% CO2, 60% CO2, 70% CO2, 80% CO2, 90% CO2, or essentially all of CO2, from these waters. Oxygenation area 126 may also be referred to as a $CO_2$ stripper. Although oxygenation area 126 is shown as part of biological filter 120, it may as well be positioned elsewhere within filtration system 100. Oxygenation area 126 may include an air inlet 116 and an air outlet 114. Air inlet 116 may include a blower configured to draw ambient air from outside filtration system 100.

In the current context, by "carbon dioxide" it is meant to further include, beside $CO_2$, all species that have inorganic carbon, including, without being limited thereto, carbonic acid ($H_2CO_3$), bicarbonate ion ($HCO_3^-$), and carbonate ion ($CO_3^{-2}$).

The $CO_2$ stripping process may be performed by any system known in the art, or disclosed hereinthroughout.

$CO_2$ stripping process suitable for the disclosed water filter, may further include, without limitation, surface aerator, or diffused aerators.

The term "surface aerator" refers to an aerator comprising a motor having a shaft attached to a propeller-type blade, all of which being suspended by a float on the surface of the water, with the propeller churning up the water and pumping the water out through the top of the aerator.

The term "diffused aerator" refers to a blower or compressor providing air flow to porous diffusers which deliver air bubbles through a water column.

Biological filter 120 may include an additional dispersing element 118 configured to form water droplets inside oxygenation area 126. Then, air flowing from the air blower may oxygenate the water droplets. Air may flow out of filtration system 100 through air outlet 114. This out-flowing air may include an increased concentration of $CO_2$ which has been removed from the water droplets.

Biological filter 120 may include a floating media bed 122 beneath dispersing element 118. Dispersing element 118 may disperse water over floating media bed 122. Water may trickle through floating media bed 122.

Figure 4:
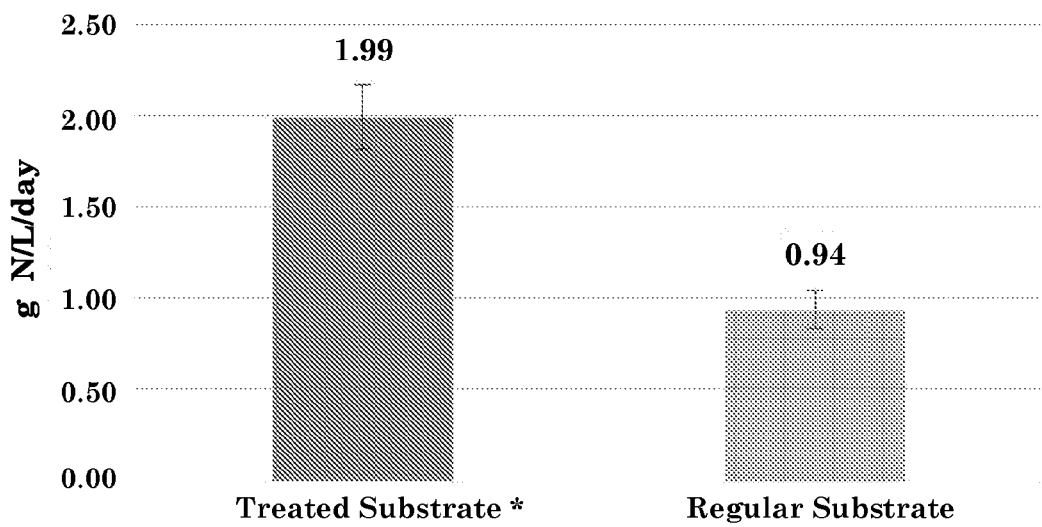
FIG. 4 is a bar graph showing the results of four trials testing nitrification rate (in grams of Nitrite per liter per day) of a reactor using the EPS beads coated with 70% poly(vinyl acetate) (PVAc) and 30% poly(vinyl pyrolidon) (PVP)

The floating media bed may be in form of a reactor as demonstrated in the Example section that follows, and as further illustrated in the scheme of FIG. 4.

By "floating media bed" it is meant to denote a volume of a low density, loose substance in the form of plurality of particles being in any particulate form, including, without limitation, finely rounded beads, amorphous structures, and/or granular media pellets, including any form of a powder, the substance being positioned on or near the surface of water.

The floating media bed 122, in some embodiments, may include micro-beads, optionally buoyant. In some embodiments, the micro-beads comprises an expanded polymer. As used herein, "expanded polymer" refers to expandable polymeric microspheres, such as by a process which includes, but not limited to, heating, aimed at reducing the microspheres density. In some embodiments the expanded polymer contains air in a mount (v/v %) of e.g., at least 40%, at least 50%, at least 60%, at least 70%, at least 80%, at least 90%, at least 95%, and at least 99%, of the total volume, including any value therebetween.

In some embodiments, the polymer is polystyrene. In some embodiments, the expanded polystyrene (EPS) is obtained by heating a PS resin comprising an expanding agent. Exemplary expanding agents include, but not limited to, pentane ($C_5H_{12}$) and butane ($C_4H_{10}$). In exemplary embodiments, ESP contains 98% vol of air and only about 2% vol of the PS resin. In some embodiments of the present invention, the expanded polymer is form of a foam structure.

As used herein and in the art, the terms "foam", or "foam structure", which are used herein interchangeably, refer to a three-dimensional porous material having a reticulated configuration in cross section and which is pliable.

In some embodiments, the micro-beads are hydrophobic.

As used herein and in the art "hydrophobic", or any grammatical diversions thereof, refers to a water-repellent property. Typically, hydrophobic polymers absorb up to 1 wt. % water at 100% relative humidity (RH), while moderately hydrophilic polymer absorbs 1-10% wt. % of water.

In some embodiments, the micro-beads may be coated. In some embodiments, the micro-beads may be modified, e.g., coated, so as to impart thereto a hydrophilic property, also referred to hereinthroughout as "hydrophilicity". As used herein and in the art, hydrophilicity is defined as the capability of being wet with water. Typically, hydrophilicity is characterized by the physical phenomena of wicking, as measured by wicking rate. Further typically, hydrophilicity is characterized by the capability of absorbing more than 10 wt. % of water.

Hydrophilicity and hydrophobicity may be characterized by the contact angle made by the water droplet on the surface of the polymer or of the coating. Typically, if the water contact angle is smaller than 90°, the solid surface is considered hydrophilic and if the water contact angle is higher than 90°, the solid surface is considered hydrophilic.

In some embodiments, the EPS surface is hydrophobic. In some embodiments, the hydrophobic EPS surface is modified by a Water Swelling and Insoluble Polymer (WSIP) coating so as to impart hydrophilic characteristics to the EPS surface. By "water swelling polymer" it is meant that upon immersion in water the polymer absorbs more than 20% of the water. The terms: "WSIP coating", "hydrophilic coating" and "hydrophilic skin" and "skin layer" are used hereinthroughout interchangeably.

As used hereinbelow "WSIP composition" refers a microbead being coated with, or being adhered to, the WSIP. In exemplary embodiments, the WSIP composition is prepared by spraying the WSIP on the EPS beads. In some embodiments, the WSIP composition is prepared by mixing the WSIP solution with the beads, to thereby coat the surface of the beads with the WSIP. In some embodiments, the WSIP composition is prepared by using a binder that binds the beads to the WSIP.

In some embodiments, the water swelling polymer absorbs, upon immersion in water, more than e.g., 25%, 30%, 35%, 40%, 45%, 50%, 55%, 60%, 70%, including any value therebetween, of the water.

Exemplary WSIPs include, but not limited to, polyesters, alginic acid, poly(vinyl acetate)(PVAc), poly(vinylpyrrolidone), and polyacrylates, poly(N-vinyl caprolactam), poly (vinyl pyrrolidone) (PVP), poly(acrylicacid) hydroxypropyl cellulose, and any copolymer and/or combination thereof.

The WSIPs are selected so as to provide the desired adhesion characteristics with respect to water environment.

By "adhesion" it is meant that the water molecules are bound to the WSIP either covalently or non-covalently. By "covalently" it is meant to refer to a bond between an atom of the polymer and an atom of the water molecule formed by sharing at least one pair of electrons. By "non-covalently" it is meant to refer to a bond including all interactions other than a covalent bond. Non-covalent bonds include, but not limited to, ionic interactions, hydrogen bonding, π-π bonding, hydrophobic interactions, and van der Waals interactions.

Exemplary WSIPs that form hydrogen or electrostatic bonding to EPS include, but not limited to, hydrophilic polymers, such as, without limitation, polyhydric alcohol, polyalkylene glycol and carboxyl-terminated polyalkylene glycol.

In some embodiments, the WSIP composition is tacky prior to contact with water. In some embodiments, the WSIP composition is non-tacky prior to contact with water. As used herein and in the art, the term "tacky" refers to a material that retains a sticky or slightly sticky feel to the touch, (e.g., with a moist surface). It is noteworthy that the compositions being generally tacky prior to contact with water gradually may lose tack as the composition absorbs moisture.

Exemplary tacky WSIPs include, but not limited to, cellulose ester or poly(N-vinyl lactam).

Exemplary non-tacky WSIPs include, but not limited to, PVAc and acrylate copolymer. It is noteworthy that compositions being generally non-tacky prior to contact with water may gradually become tacky upon contact with moist conditions.

In some embodiments, the WSIP composition is hydrogel. As used herein and in the art, the term "hydrogel" refers to a three-dimensional network of cross-linked hydrophilic polymeric network typically containing more than 80% of an aqueous medium (e.g., water or an aqueous solution) and 20% or less of the polymeric material.

In some embodiments, hydrogel contains more than 90% aqueous medium (e.g., water or an aqueous solution), and even more than 95% or about 99% aqueous medium (e.g., water or an aqueous solution), and less than 10% of the polymeric material, or even less than 5% of the polymeric material e.g., about 1% of the polymeric material. By "%" it is meant herein weight percents. Typically, hydrogel can be reversibly dried and wetted.

Exemplary non-tacky WSIPs that form hydrogels include, but not limited to, acrylic acid, and acrylate copolymer. Typically, hydrogels prepared with an acrylic acid/acrylate WSIP are substantially non-tacky prior to contact with water, but become tacky in moist conditions.

Figure 3A:
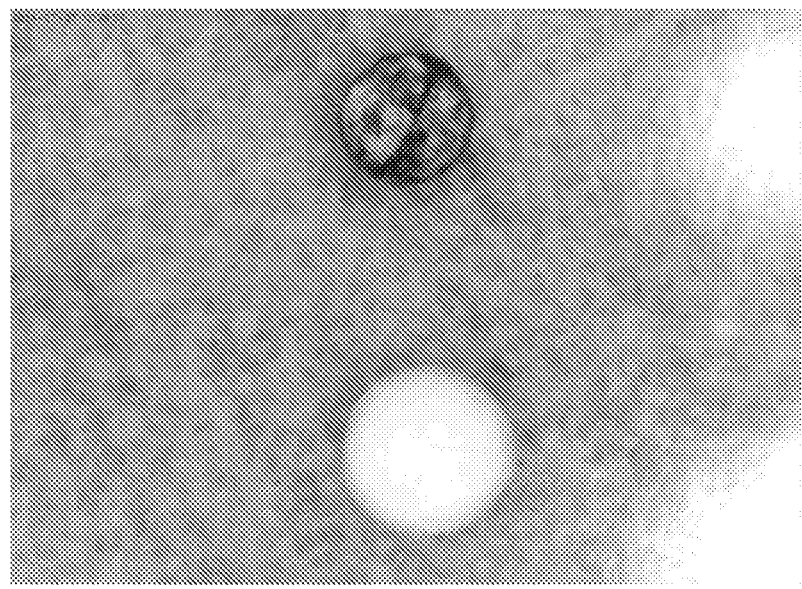
FIGS. 3A and 3B show optical microscopy images demonstrating expanded polystyrene (EPS) beads having PVAc coating.

FIG. 3A shows a reference image of uncoated EPS (being a white sphere) vis-à-vis a bead coated with PVAc (×40 magnification).

Figure 3B:
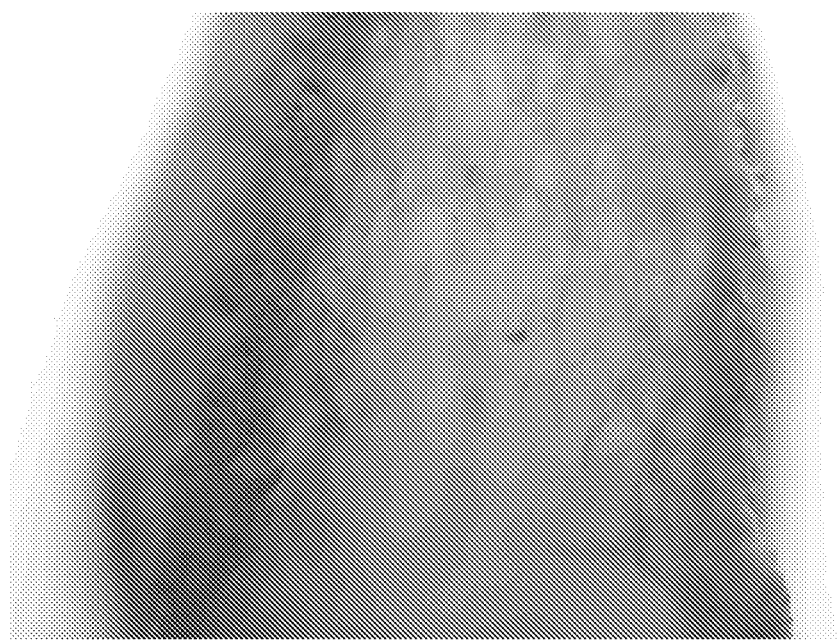

FIG. 3B shows an image showing EPS beads coated with PVAc being cut using a sharp knife, revealing a skin layer coating adhered to the inner EPS layer, with the skin layer having a thickness of about 10 to 50 microns (×200 magnification).

In some embodiments of the present invention, the coating has a thickness of e.g., about 5 μm, about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm, about 100 μm, about 120 μm, about 130 μm, about 140 μm, about 150

μm, about 160 μm, about 170 μm, about 180 μm, about 190 μm, about 200 μm, including any value therebetween.

Floating media bed 122 may include micro-beads configured to allow growth of nitrifying bacteria.

As used herein the terms "nitrifying", "nitrification", and any grammatical deviation thereof refer to, without being bound by any particular theory, an aerobic two-step process, where the ammonia is first oxidized to nitrite ($NO_2^-$) as shown in the equation below:

$$55NH_4^+ + 5CO_2 + 76O_2 \rightarrow C_5H_7NO_2 + 54NO_2^- + 52H_2O + 109H^+$$

and then nitrite is oxidized to nitrate ($NO_3^-$), carried out by autotrophic nitrifying bacteria as shown in the equation below:

$$400NO_2^- + 5CO^2 + NH_4^+ + 195O_2 + 2H_2O \rightarrow C_5H_7NO_2 + 400NO_3^- + H^+$$

The overall redox reaction, can be written as the following equation:

$$NH_4^+ + 2O_2 \rightarrow NO_3^- + 2H^+ + H_2O$$

Typically, the nitrification step carried out by the bacteria is characterized by relatively low growth rate. Therefore, in order to establish a large bacterial population and correspondingly high ammonia oxidation rate (also referred to, hereinthroughout, as "nitrification rate") solid material is supplied to support bacterial growth as "fixed film". Higher surface area of such supporting bed will enable higher reaction rate.

Exemplary nitrifying bacteria include, but not limited to, cyano bacteria, mutualistic bacteria, and any combination thereof.

In some embodiments of the present invention, the bacterial attachment to surface of the beads leads to the formation of sessile communities of bacterial cells. This sessile community of microorganisms, also termed hereinthroughout a "biofilm" or "bacterial film", is attached to an interface, or to each other, and embedded in an exopolymeric matrix.

Hence, the terms "biofilm", or "film" as used herein in this context, refer to an aggregate of living cells which are stuck to each other and/or substantially immobilized onto a surface as colonies. In some embodiments, the cells are frequently embedded within a self-secreted matrix of extracellular polymeric substance (EPS), also referred to as "slime", which is a polymeric sticky mixture of nucleic acids, proteins and polysaccharides.

In some embodiments of the present invention, the nitrification rate ranges from about 0.5 grams of nitrite per liter per day to about 2.5 grams of nitrite per liter per day. In some embodiments, the nitrification rate is about e.g., 0.5 grams of nitrite per liter per day, 1 grams of nitrite per liter per day, 1.5 grams of nitrite per liter per day, 2 grams of nitrite per liter per day, or 2.5 grams of nitrite per liter per day, including any value therebetween.

Figure 5:
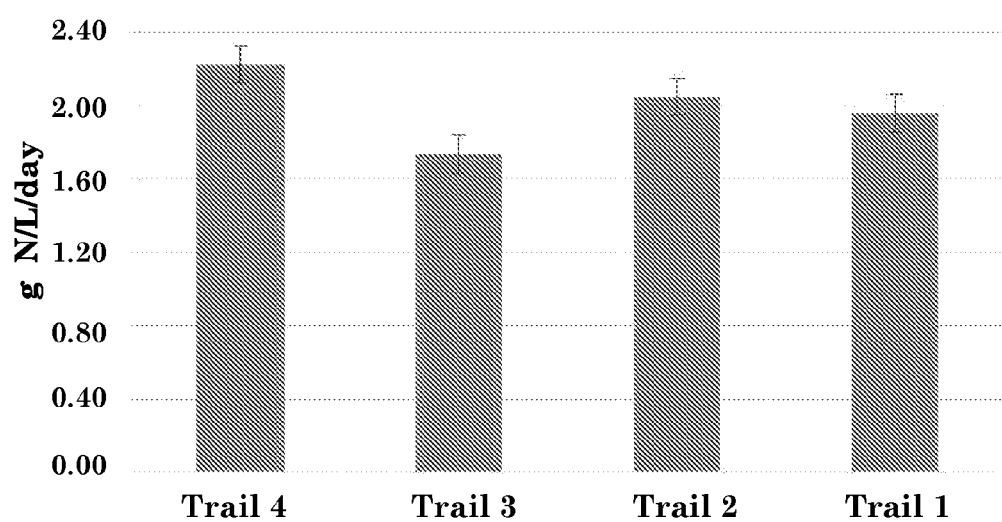
FIG. 5 is a bar graph showing the average results of trials testing nitrification rate (in grams of Nitrite per liter per day) of a reactor using the EPS beads coated with 70% poly(vinyl acetate) (PVAc) and 30% poly(vinyl pyrolidon) (PVP), compared to nitrification rate of regular substrates being used in the industry.

As demonstrated in the Example section that follows and as further demonstrated in FIGS. 4 and 5, when using expanded polystyrene (ESP) coated with hydrophilic coating, e.g., PVAc+PVP, the nitrification rate is about 2.5 grams of nitrite per liter per day.

Floating media bed 122 may include micro-beads that may be about 0.1 mm to about 5 mm in diameter. In some embodiments, the micro-beads are about e.g., 0.1 mm, 0.5 mm, 1 mm, 1.5 mm, 2 mm, 2.5 mm, 3 mm, 3.5 mm, 4 mm, 4.5 mm, 4.7 mm, 5 mm, including any value therebetween. As used herein, "diameter" refers to the largest dimension in any one of said beads.

Floating media bed 122 may include micro-beads that have an overall bulk density of about 0.1 to 20 kg/m³. In some embodiments, the overall bulk density is about e.g., 0.1 kg/m³, 0.2 kg/m³, 0.3 kg/m³, 0.4 kg/m³, 0.5 kg/m³, 0.6 kg/m³, 0.7 kg/m³, 0.8 kg/m³, 0.9 kg/m³, 1 kg/m³, 5 kg/m³, 12 kg/m³, 13 kg/m³, 14 kg/m³, 15 kg/m³, 16 kg/m³, 17 kg/m³, 18 kg/m³, 19 kg/m³, 20 kg/m³, including any value therebetween. Overall bulk density is calculated by dividing the total weight of the beads by their volume.

Floating media bed 122 may include micro-beads with about 25 to 50 percent porosity. In some embodiments, micro-beads have about e.g., 25%, 30%, 35%, 40%, 45%, 50% porosity, including any value therebetween.

Floating media bed 122 may include micro-beads with a surface area per unit volume of beads of about 250 to 4750 m²/m³. In some embodiments, micro-beads have surface area per unit volume of beads of about e.g., 250 m²/m³, 750 m²/m³, 1250 m²/m³, 1750 m²/m³, 2250 m²/m³, 2750 m²/m³, 3250 m²/m³, 3750 m²/m³, 4250 m²/m³, 4750 m²/m³, including any value therebetween.

Optionally, filtration system 100 may include a fine sieve (not shown) downstream biological filter 120. The fine sieve may be a perforated plate with a pore size of about 10 to 60 microns. In some embodiments, the pore size is about, e.g., 10 microns, 15 microns, 10 microns, 15 microns, 20 microns, 25 microns, 30 microns, 35 microns, 40 microns, 45 microns, 50 microns, 55 microns, 60 microns, including any value therebetween.

Water trickling through floating media bed 122 may flow through the fine sieve. The fine sieve may remove particles larger than the size of its pores from water flowing through it.

Filtration system 100 may have a water outlet 128. Water outlet 128 may be a pipe. Water outlet 128 may be an opening of various shapes and sizes in housing 101. Water outlet 128 may be configured as a siphon. Water outlet 128 may allow filtered water to exit filtration system 100. Water outlet 128 may be positioned downstream of biological filter 120.

According to an aspect of some embodiments of the present invention there is provided a method for water filtering, using any of the water filters of described herein.

In some embodiments, the method comprises filtering water by a mechanical filter as described herein and thereafter filtering said water in a biological filter as described herein. In some embodiments, filtering water by a mechanical filter is performed so as to substantially remove solids from unfiltered water.

In some embodiments, filtering water in a biological filter, is performed to substantially remove carbon dioxide from the water. In some embodiments, and the water is further allowed to pass into floating media bed constituting at least part of the biological filter, to substantially remove ammonia content from the water.

Reference is now made to FIGS. 2A, 2B, 2C, 2D and 2E which show block diagrams of different configurations of filtration system 100. Mechanical filter 104 may be connected to, attached to or integrally formed with biological filter 120. Mechanical filter 104 may stand alone, detached from other elements of filtration system 100. Biological filter 120 may stand alone, detached from other elements of filtration system 100.

Figure 2A:
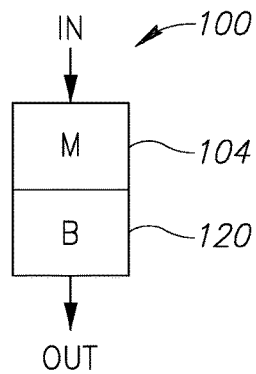
FIGS. 2A, 2B, 2C, 2D and 2E show block diagrams of different configurations of the exemplary filtration system.

In reference to FIG. 2A, mechanical filter 104 may be positioned above biological filter 120. Mechanical filter 104 may be positioned directly above biological filter 120. Water may be transported from mechanical filter 104 to biological filter 120 by pumps and/or gravitational force.

Figure 2B:
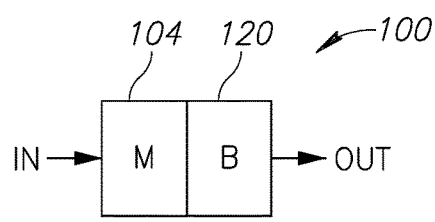

In reference to FIG. 2B, mechanical filter 104 may be positioned parallel to biological filter 120. Mechanical filter 104 may be positioned directly parallel to biological filter 120. Water may be transported from mechanical filter 104 to biological filter 120 by pumps and/or gravitational force.

A pipe 130 may be connected to, attached to or integrally formed with mechanical filter 104. A pipe 130 may be connected to, attached to or integrally formed with biological filter 120.

Figure 2C:
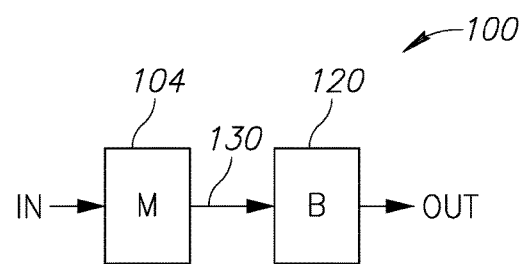

In reference to FIG. 2C, mechanical filter 104 may be positioned on the same spatial plane as biological filter 120. Water may flow from mechanical filter 104 through pipe 130. Water may flow to biological filter 120 through pipe 130. Water may be transported from mechanical filter 104 to pipe 130 by pumps and/or gravitational force. Water may be transported from pipe 130 to biological filter 120 by pumps and/or gravitational force.

Figure 2D:
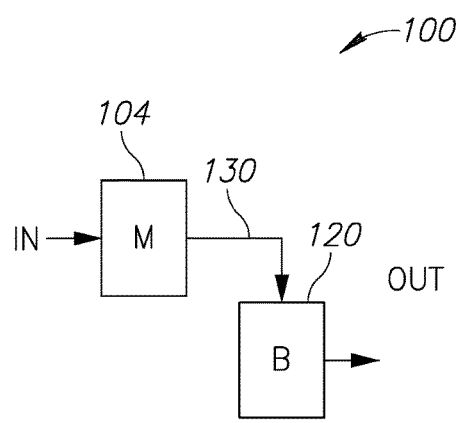

In reference to FIG. 2D mechanical filter 104 may be positioned in a spatial plane above the spatial plane of biological filter 120. Water may flow from mechanical filter 104 through pipe 130. Water may flow to biological filter 120 through pipe 130. Water may be transported from mechanical filter 104 to pipe 130 by pumps and/or gravitational force. Water may be transported from pipe 130 to biological filter 120 by pumps and/or gravitational force.

Figure 2E:
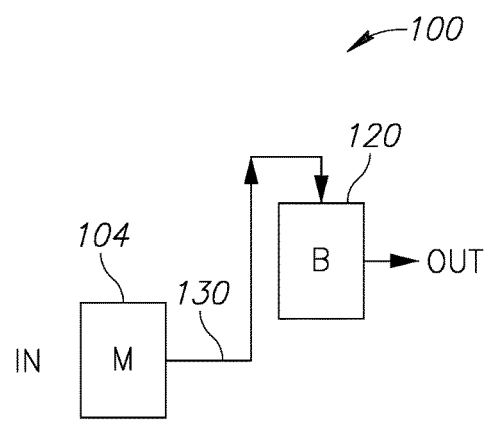

In reference to FIG. 2E, mechanical filter 104 may be positioned in a spatial plane below the spatial plane of biological filter 120. Water may flow from mechanical filter 104 through pipe 130. Water may flow to biological filter 120 through pipe 130. Water may be transported from mechanical filter 104 to pipe 130 by pumps. Water may be transported from pipe 130 to biological filter 120 by pumps.

General:

As used herein the terms "approximately" and "about" which are used hereinthroughout interchancheably refer to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

In addition, where there are inconsistencies between this application and any document incorporated by reference, it is hereby intended that the present application controls.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples which, together with the above descriptions, illustrate the invention in a non limiting fashion.

Example 1

Sample Preparation of Micro-Beads with Hydrophilic Coating

Materials:
Core—Expanded polystyrene: EPS having a density of 45 kg/m3 and diameter of 1.4-1.6 mm.
Hydrophilic coating ("skin"): Poly(vinyl acetate)/poly (vinylpyrrolidone) (Kollidon S R, BASF, W. Rosenstein)

The selected process comprises the following steps:

Step A: Preparation of hydrophilic coating composition based on mixing and dissolving of poly(vinyl acetate) (PVAc).

Step B: Application a PVAc composition on the surface of the EPS particles.

Step C: Drying and separation of the coated EPS beads to individual particles.

Step A: Preparation of Hydrophilic Coating Composition Based on Mixing and Dissolving of PVAc:

In exemplary procedures, the hydrophilic coating is PVAc. PVAc solution was prepared by dissolving 3-10 wt % of PVAc in solvents like alcohols, esters, aromatics, and halogenated hydrocarbons. It is preferred to select a solvent having relatively high volatility and reduced toxicity. In this respect, alcohols are preferred. The concentration of the PVAc is determined taking into account the adhesion to the surface of the EPS particles, workability and handling. Plasticizers, colorants, surfactants, silica can be added.

In exemplary procedures, 30 grams of a polyvinyl acetate resin was uniformly dissolved in 465 grams of methanol to prepare 0.5 kg PVAc solution. 5 grams of a carbon black (Mogul L) was added to the polymer solution, with stirring for one hour to prepare 1 kg of a black-colored solution to control the surface coating. The resulting mixture (referred to as "solution A1" hereinbelow) was uniformly dispersed.

In additional exemplary procedures, the hydrophilic coating is 70% PVAc and 30% poly(vinyl pyrolidon) (PVP). In exemplary procedures, the solution prepared by uniformly dissolving 30 grams of a Collidon SR in 470 grams of methanol (referred to as "solution A2" hereinbelow). Red colorant may optionally be further added.

Step B: Application a PVAc Composition on the Surface of the EPS Particles:

The "solution A" containing the functional additive was uniformly applied on the surface of the EPS by spraying followed by separation and drying.

For separation, a liquid or powder different from the solvent used to prepare the PVAc solution is used. Examples of suitable release agents include, water, ethylene glycol and glycerin, and silicone oils. Solid release agents can be e.g., silica, or silicates. The release agent is used in an amount of 5-20% of the PVAc.

After adding the release agent, the mixture was dried while stirring to separate the coated EPS into individual particles. Drying was carried out in hot air at 100° C. or lower while stirring. For better workability, a combination of vacuum drying and heating was most effective.

In exemplary procedures, 15 grams (0.33 L) of EPS particles were charged into a 5-liter pan mixer, and 50 grams of the PVAc solution, as described in the exemplary procedures hereinabove, was next added to the EPS while stirring at 20 rpm for one minute to uniformly coat the EPS particles.

In additional exemplary procedures, the coating on ESP beads was performed by spraying into the pan containing 1 L of the EPS (30 grams) and 50 mL of "solution A2", for one minute to uniformly coat the ESP.

Step C: Drying and Separation of the Coated EPS Beads to Individual Particles:

In exemplary procedures (referred to as "step C1" hereinbelow), stirring continued for about 10 seconds while applying hot air using hair dryer fan to the pan mixer. Then, 10 grams of water was sprayed while stirring to allow the coated EPS to separate into individual particles. The separated particles were dried while stirring for 3 minutes to obtained dry particles (referred to as "product C1" hereinbelow).

In additional exemplary procedures, the stirring was continued for about 30 seconds while applying hot air at 60° C. The separated particles were dried with stirring for 3 minutes to produce PVAc+PVP coated ESP (referred to as "product C2" hereinbelow).

Example 2

Characterization of Micro-Beads with Hydrophilic Coating

The characteristics of the PVAc based-hydrophilic EPS ("Product C1") were as follows:

The amount of EPS beads in 1 $cm^3$ was 200-210; The average diameter of the beads was 0.16 cm; The average surface of 1 bead was 0.08 $cm^2$; The average surface of 1 $cm^3$ beads was 16 $cm^2$; 15 $cm^3$ of beads amounted to 240 $cm^2$; The amount of solid of 50 grams of a PVAc solution was 3 grams; The average coating of the surface was 10 mg/$cm^2$ (or 100 mg/$dm^2$); and the average thickness of coating was about 20 microns.

The PVAc/PVP based-hydrophilic EPS ("Product C2") had a coating of 0.05 mg/$cm^2$, with fine hydrophilic property.

Hydrophilicity Test:

Solution A was poured on PS petri and dried. Uniform adhesion of the skin layer to PS was observed. Water drop wetted the surface of treated PS.

Skin-Core Structure:

For observation of the skin-core structure of the coated EPS, particles as produced in step C1 were selected. To follow the coating process, a pigment was added to the coating solution. Optical microscopy at ×40 magnification is presented in FIG. 3a, and, as can be observed in this Figure the EPS particles are spherical particle and completely coated with the skin layer (non-homogeneous). Reference is an uncoated white sphere.

To estimate the coating thickness, selected coated EPS beads were cut using a sharp knife and analyzed at higher magnification (FIG. 3b; ×200). The skin layer completely adheres to the inner EPS layer having a thickness of 10-50 microns. According to calculation average thickness is about 20 microns.

Example 3

Oxidation Rate of the Hydrophilic EPS

The treated substrate (i.e. product C2) was delivered and placed in reactors in the laboratory. In order to understand the biological and chemical affects of the new substrate, the reactor was built as a small-scale prototype, according to the following characteristics:

Diameter: 110 mm;
Height: 30 cm;
Volume of the media: 2.25 L;
Volume of water: 100 L;
Flow rate (from the container to the reactor): 3 L/m (0.18 m3/hr).

Pre-Treatment:

The reactor contained 100 L of water and 2 liters of the treated substrate. A bacterial film was nurtured with about 20 to about 60 grams of $NH_4Cl$ (i.e. about 5 to about 15 grams N) and 60-180 grams of calcium bicarbonate ($HCaCO_3$). The water circulated from the container into the reactor at a flow rate of 0.18 $m^3$/hr, and was saturated with air, using a diffuse stone. When the bacterial film was stable, several 24-hours trials were conducted in order to examine the oxidation rate of ammonia and nitrite in the reactor.

At the same time, four medium-scale reactors containing varying volumes of untreated substrate were maintained on a daily basis, by adding 150 grams of $NH_4Cl$ and 300 grams of $HCaCO_3$ to the collection container.

The trials were designed to compare between the ammonia oxidation rate of the treated substrate and a control of untreated substrate. The treated substrate had a large surface area of 4100 $m^2/m^3$ for processing nitrifying bacteria. The experiments were conducted the prototype bioreactors with optimal conditions for the growth of ammonia and nitrite-oxidizing bacteria.

Experimental Goals and Parameters:

The experiments allowed to:

Determine the optimum operating procedure;

Compare between the efficiency of the treated substrate and the untreated substrate; and to Determine the maximal ammonia oxidizing rate (N–(gr)/ [substrate (L)*day]).

The formula below was used to calculate the ammonia oxidizing capacity:

$$\frac{\frac{\Delta N * V1}{\Delta t} * 24}{V2 * 1000} = \frac{g}{L * d}$$

wherein:

N=nitrogen concentration;

V1=volume of the container;

V2=substrate volume inside the reactor; and t=time.

In order to compare the treated substrate to the untreated substrate, several experiments were conducted on a small-scale proprietary-substrate reactor and four medium-scale untreated-substrate reactors.

In exemplary procedures the experiments were conducted in the following way: The water in the container was replaced with fresh underground water. 20 to 30 grams of $NH_4Cl$ and 60 grams to 180 grams of $HCaCO_3$ were thereafter added to the small-scale container, while 150 grams of $NH_4Cl$ and 300 grams of $HCaCO_3$ were added to the medium-scale containers. A sample was taken immediately after the insertion of the chemicals (T=0). Two more samples were taken two hours and four hours after the beginning of the trial (T=2, T=4), and a fourth sample was taken 24 hours after the beginning of the trial (T=24). The samples were treated with 200 µl of 0.05N HCl solution, in order to decrease the pH. The samples were next stored in a refrigerator and after 24 hours, the samples were tested for ammonia and nitrite concentrations, using a spectrophotometer.

The trials were conducted throughout the course of three months, through which the bacterial film was maintained on a daily basis, by adding $NH_4Cl$ and $HCaCO_3$.

Results:

Several trials were performed to examine the oxidation rate when using the treated substrate. As can be seen in FIG. 4, the average oxidation rate was 1.99 N-g/l day, which is higher than other substrates in the industry.

The comparison trials, that were conducted in order to compare the treated substrate and the untreated substrate, show that the treated substrate oxidation rate was more than two times higher than the untreated substrate, as shown in FIG. 5.

The results prove that the treated substrate, used in the small-scale reactor, is significantly more effective in oxidizing ammonia and nitrite than the untreated substrate used in the four other reactors in the wet laboratory.

These results present an optimistic horizon for Recirculating Aquaculture Systems (RAS) and in the field of water treatment in general.

What is claimed is:

1. A water filter comprising:
   a mechanical filter comprising
      at least one sieve configured to remove solids from said water, said sieve having pores sized to stop particles from crossing through said sieve and accumulating on a first side thereof, said sieve having a conical geometry comprising an apex and walls having a negative slope originating from the apex, said apex facing
      a water disperser configured for dispersing unfiltered water over said sieve; and
      at least one evacuation opening at said sieve apex that opens to said first side of said sieve, said evacuation opening fluidly coupled to a pipe that carries particles exiting said opening out of said filtration system; and
      at least one nozzle open towards a second, opposite side of said sieve and configured to inject fluid through said sieve pores and drive said particles towards said evacuation opening; and
   a biological filter in fluid communication with the mechanical filter, said biological filter comprising a carbon dioxide stripper and a nitrification bed comprising beads, said beads comprise expanded polystyrene and hydrophilic coating,
   wherein said biological filter is disposed downstream of said mechanical filter and is configured to receive mechanically filtered water from said mechanical filter, wherein the mechanically filtered water is substantially free of solids.

2. The water filter of claim 1, wherein said mechanical filter and said biological filter are co-located as a single module.

3. The water filter of claim 1, wherein said sieve is characterized by a pore size of approximately 50 to 120 micrometers.

4. The water filter of claim 1, wherein said mechanical filter further comprises an opening configured to allow particles removed from the water by said sieve to exit said mechanical filter.

5. The water filter of claim 1, wherein said biological filter further comprises a second dispersing element, said second dispersing element being configured to disperse mechanically filtered water from said mechanical filter into said carbon dioxide stripper.

6. The water filter of claim 1, wherein said biological filter further comprises a floating media bed.

7. The water filter of claim 6, wherein said floating media bed comprises multiple beads configured to allow growth of nitrifying bacteria.

8. The water filter of claim 7, wherein said nitrifying bacteria form bacterial biofilm.

9. The water filter of claim 7, wherein said multiple beads are characterized by having an overall bulk density that ranges from approximately 0.1 $kg/m^3$ to approximately 1 $kg/m^3$.

10. The water filter of claim 7, wherein said multiple beads are characterized by having a surface area per unit volume that ranges from about 200 $m^2/m^3$ to about 5000 $m^2/m^3$.

11. The water filter of claim 7, wherein said multiple beads are each characterized by a largest dimension measuring between approximately 0.05 mm and approximately 10 mm.

12. The water filter of claim 7, wherein each of said multiple beads is hydrophilically coated by one or more materials selected from the group consisting of: poly(vinyl acetate), poly(vinylpyrrolidone), ester, alginic acid, acrylate, poly(n-vinyl caprolactam), polyhydric alcohol, poly(alkylene glycol), poly(acrylic acid)-hydroxypropyl, and any copolymer thereof.

13. The water filter of claim 1, characterized by a nitrification rate that ranges from approximately 0.5 grams of nitrite per liter per day to approximately 2.5 grams of nitrite per liter per day.

14. A method for water filtering, the method comprising the following steps, being performed sequentially:
(a) filtering water by a mechanical filter, said mechanical filter comprising at least one sieve, said sieve having a conical geometry comprising an apex and walls having a negative slope originating from the apex, said apex facing a water disperser configured for dispersing unfiltered water over said sieve, such that
(b) substantially removing solids from said water by:
1) accumulating particles on a first side of said sieve;
2) injecting fluid from a second, opposite side of and through said sieve; and
3) driving said particles towards an evacuation opening on said first side of said sieve; and
(c) filtering said water in a biological filter comprising beads, the filtering comprising:
1) operating an air blower so as to oxygenate said water and substantially remove carbon dioxide from said water; and
2) allowing the water to pass into floating media bed, said floating media bed comprising beads attached to nitrifying bacteria, said beads comprise expanded polystyrene and hydrophilic coating, so as to substantially remove ammonia content from said water.

15. The method of claim 14, wherein step (b) further comprises a step of dispersing the water to form water droplets, said dispersing being followed by said air blowing.

16. The method of claim 14, characterized by a nitrification rate that ranges from approximately 0.5 grams of nitrite per liter per day to approximately 2.5 grams of Nitrite per liter per day.

* * * * *